US011364746B2

(12) United States Patent
Uemura et al.

(10) Patent No.: US 11,364,746 B2
(45) Date of Patent: Jun. 21, 2022

(54) PNEUMATIC TIRE

(71) Applicant: The Yokohama Rubber Co., LTD., Tokyo (JP)

(72) Inventors: Takanori Uemura, Hiratsuka (JP); Hiraku Kouda, Hiratsuka (JP); Tatsuro Shinzawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 636 days.

(21) Appl. No.: 16/077,724

(22) PCT Filed: Feb. 14, 2017

(86) PCT No.: PCT/JP2017/005360
§ 371 (c)(1),
(2) Date: Aug. 13, 2018

(87) PCT Pub. No.: WO2017/141914
PCT Pub. Date: Aug. 24, 2017

(65) Prior Publication Data
US 2021/0122194 A1    Apr. 29, 2021

(30) Foreign Application Priority Data

Feb. 15, 2016  (JP) .............................. JP2016-025845

(51) Int. Cl.
*B60C 11/12* (2006.01)
(52) U.S. Cl.
CPC ...... *B60C 11/1281* (2013.01); *B60C 11/1204* (2013.01); *B60C 11/1236* (2013.01)
(58) Field of Classification Search
CPC ............. B60C 11/1204; B60C 11/1236; B60C 11/1281; B60C 11/1384; B60C 11/1392
See application file for complete search history.

(56) References Cited

U.S. PATENT DOCUMENTS

| 2010/0084062 A1* | 4/2010 | Miyazaki ............ B60C 11/1281 152/209.18 |
| 2013/0167997 A1* | 7/2013 | Hayashi .............. B60C 11/0306 152/209.18 |

(Continued)

FOREIGN PATENT DOCUMENTS

| DE | 3600618 | * | 7/1987 |
| DE | 102012101817 | * | 9/2013 |

(Continued)

OTHER PUBLICATIONS

English machine translation of EP0213452. (Year: 1987).*

(Continued)

*Primary Examiner* — Robert C Dye
(74) *Attorney, Agent, or Firm* — Thorpe North & Western (57) ABSTRACT

A rib of a pneumatic tire includes a first sipe extending from one of main grooves positioned on both sides of the rib and a second sipe extending from another one of the main grooves, one end portion of the first and second sipes terminating within the rib. The first and second sipes form a pair of sipes including edges on leading and trailing sides. Chamfered portions shorter than a total sipe length of the pair of sipes are formed on respective edges and non-chamfered regions exist on portions opposing respective chamfered portions in the pair of sipes. A maximum depth x (mm) of the sipes and a maximum depth y (mm) of the chamfered portion satisfy x×0.1≤y≤x×0.3+1.0. A sipe width is constant in a range from a portion positioned inside in a tire radial direction of the chamfered portion to a bottom of the sipes.

12 Claims, 8 Drawing Sheets

(56) References Cited

U.S. PATENT DOCUMENTS

| | | | |
|---|---|---|---|
| 2013/0206298 A1 | 8/2013 | Guillermou et al. | |
| 2014/0283967 A1* | 9/2014 | Inoue | B60C 11/0304 |
| | | | 152/209.18 |
| 2015/0210121 A1 | 7/2015 | Sanae | |
| 2016/0297254 A1 | 10/2016 | Numata | |
| 2017/0106703 A1* | 4/2017 | Kubo | B60C 11/1236 |
| 2018/0086149 A1* | 3/2018 | Hoshino | B60C 11/0306 |
| 2018/0126790 A1* | 5/2018 | Muhlhoff | B60C 11/0306 |

FOREIGN PATENT DOCUMENTS

| | | | |
|---|---|---|---|
| EP | 0213452 | * | 3/1987 |
| JP | 2003-159911 | * | 6/2003 |
| JP | 2005075213 | * | 3/2005 |
| JP | 2013-035345 | | 2/2013 |
| JP | 2013-537134 | | 9/2013 |
| JP | 2015-047977 | | 3/2015 |
| JP | 2015-140047 | | 8/2015 |
| JP | 2015-231812 | | 12/2015 |
| JP | 2016-088165 | | 5/2016 |
| WO | WO 2012/032144 | | 3/2012 |
| WO | WO 2015/083474 | | 6/2015 |
| WO | WO2016128085 A1 | * | 8/2016 |

OTHER PUBLICATIONS

English machine translation of WO2016128085A1. (Year: 2016).*
English machine translation of DE102012101817. (Year: 2013).*
English machine translation of JP2005-075213. (Year: 2005).*
International Search Report for International Application No. PCT/JP2017/005360 dated Apr. 4, 2017, 4 pages, Japan.

* cited by examiner

PNEUMATIC TIRE

TECHNICAL FIELD

The present technology relates to a pneumatic tire, more specifically relates to a pneumatic tire capable of providing good improvement of steering stability performance on dry road surfaces and improvement of steering stability performance on wet road surfaces in a compatible manner, and additionally capable of improving braking performance on dry road surfaces by devising a chamfer shape of a sipe.

BACKGROUND ART

In the related art, a plurality of sipes is formed on a rib defined by a plurality of main grooves in a tread pattern of a pneumatic tire. By forming these sipes, drainage properties are ensured, and the steering stability performance on wet road surfaces is delivered. However, when a lot of sipes are disposed in a tread portion for enhancing the steering stability performance on wet road surfaces, there are disadvantages in which the steering stability performance on dry road surfaces, the braking performance and uneven wear resistance performance lower due to lowering of rigidity of a rib.

Additionally, various kinds of pneumatic tires in which sipes are formed in a tread pattern, and chamfered are proposed (for example, see Japanese Unexamined Patent Publication No. 2013-537134). When sipes are formed and chamfered, an edge effect may be lost depending on a chamfer shape, and the steering stability performance on dry road surfaces or the steering stability performance on wet road surfaces may be insufficiently improved depending on a chamfer dimension.

SUMMARY

The present technology provides a pneumatic tire capable of providing good improvement of steering stability performance on dry road surfaces and improvement of steering stability performance on wet road surfaces in a compatible manner, and additionally capable of improving braking performance on dry road surfaces by devising a chamfer shape of a sipe.

A pneumatic tire of the present technology includes a plurality of main grooves extending in a tire circumferential direction in a tread portion including sipes extending in a tire lateral direction on a rib defined by the main grooves, in which the rib includes the sipe extending from one of the main grooves and the sipe extending from another one of the main grooves, the main grooves being positioned on both sides of the rib, respectively; one end portion of both end portions of the sipe opens into the main groove and another end portion terminates within the rib; in a case that two of the sipes extending from main grooves on both sides of the rib are regarded as a pair of sipes when a distance in a tire circumferential direction between end portions of the two of the sipes that terminate within the rib is not greater than 15 mm, the pair of sipes include edges on a leading side and edges on a trailing side; chamfered portions shorter than a total sipe length of the pair of sipes are formed on respective edges on the leading side and on the trailing side; non-chamfered regions on which no other chamfered portion exists exist on portions opposing to respective chamfered portions in the pair of sipes; a maximum depth x (mm) of the sipe and a maximum depth y (mm) of the chamfered portion satisfy Relationship (1) below; and a sipe width of the sipe is constant in a range from an end portion positioned inside in a tire radial direction of the chamfered portion to a groove bottom of the sipe.

$$x \times 0.1 \leq y \leq x \times 0.3 + 1.0 \tag{1}$$

In the present technology, in a pneumatic tire including a sipe extending in a tire lateral direction on a rib defined by main grooves, by providing respective chamfered portions shorter than a total sipe length of a pair of sipes on edges on a leading side and on a trailing side of the pair of sipes, whereas providing non-chamfered regions on which no other chamfered portion exists on respective portions opposing to chamfered portions in the pair of sipes, it is possible to enhance a drainage effect based on the chamfered portion, and at the same time, to effectively remove a water film on the non-chamfered region by an edge effect. Accordingly, it is possible to improve steering stability performance on wet road surfaces significantly. Additionally, since the chamfered portion and the non-chamfered region are provided on the respective edges on the leading side and on the trailing side in a mixed manner, it is possible to maximally enjoy an effect of enhancing the above-described wet performance during braking and driving. In addition, an area to be chamfered may be minimized in comparison with a sipe chamfered as in the related art, thus it is possible to improve steering stability performance on dry road surfaces. As a result, it is possible to provide good improvement of the steering stability performance on wet road surfaces and improvement of the steering stability performance on dry road surfaces in a compatible manner. Further, by providing the pair of sipes configured with two sipes terminating within the rib and extending from the different main grooves, the rib is formed to be continuous at a portion at or near a central portion of the rib without being divided by the pair of sipes, thus it is possible to improve tread rigidity in a tire circumferential direction and improve braking performance on dry road surfaces.

In the present technology, the chamfered portion preferably projects from the other end portion of the sipe and extends in a length direction of the sipe. Disposing the chamfered portion as described above makes it possible to provide good improvement of block rigidity and enhancement of drainage properties in a compatible manner.

In the present technology, a total sipe length of the pair of sipes is preferably from 0.4 to 1.0 times a rib width of the rib. As described above, by setting the total sipe length of the pair of sipes to an appropriate length, it is possible to provide good improvement of the steering stability performance on dry road surfaces and improvement of the steering stability performance on wet road surfaces in a compatible manner, and improve the braking performance on dry road surfaces. More preferably, the length is from 0.5 to 0.7 times the width.

In the present technology, preferably, the sipe is inclined with respect to the tire circumferential direction. As described above, by making the sipe inclined, it is possible to improve rigidity of the rib and further improve the steering stability performance on dry road surfaces.

In the present technology, an inclination angle on an acute angle side with respect to the tire circumferential direction of the sipe is preferably from 40° to 80°. As described above, by setting the inclination angle on the acute angle side with respect to the tire circumferential direction of the sipe, it is possible to improve the steering stability performance on dry road surfaces more effectively. More preferably, the angle is from 50° to 70°.

In the present technology, the chamfered portion is preferably disposed on the acute angle side of the sipe. In this way, it is possible to further enhance uneven wear resistance performance. Alternatively, the chamfered portion is preferably disposed on an obtuse angle side of the sipe. Accordingly, the edge effect increases, thereby making it possible to further improve the steering stability performance on wet road surfaces.

In the present technology, at least part of the sipe preferably curves or bends in a plan view. By forming at least part of the sipe as described above, a total amount of the edge of each of the sipes increases, thereby making it possible to improve the steering stability performance on wet road surfaces. The whole sipe may be an arc.

In the present technology, the chamfered portion preferably opens into the main groove. Accordingly, it is possible to further improve the steering stability performance on wet road surfaces. Alternatively, the chamfered portion preferably terminates within the rib. Accordingly, it is possible to further improve the steering stability performance on dry road surfaces.

In the present technology, an overlap length of the chamfered portion formed on the edge on the leading side of the sipe and the chamfered portion formed on the edge on the trailing side of the sipe is preferably from −30% to 30% of the total sipe length. As described above, by appropriately setting the overlap length of the chamfered portion with respect to the total sipe length, it is possible to provide good improvement of the steering stability performance on dry road surfaces and improvement of the steering stability performance on wet road surfaces in a compatible manner. More preferably, the overlap length is from −15% to 15% of the total sipe length.

In the present technology, the chamfered portion is preferably disposed on a position of the edge on the leading side and on a position of the edge on the trailing side of the sipe. Disposing the chamfered portions as described above makes it possible to improve the uneven wear resistance performance.

In the present technology, a maximum width of the chamfered portion is preferably from 0.8 to 5.0 times a sipe width of the sipe. As described above, by appropriately setting the maximum width of the chamfered portion with respect to the sipe width, it is possible to provide good improvement of the steering stability performance on dry road surfaces and improvement of the steering stability performance on wet road surfaces in a compatible manner. More preferably, the maximum width is from 1.2 to 3.0 times the sipe width.

In the present technology, the chamfered portion preferably extends in parallel with the sipe. Accordingly, it is possible to improve the uneven wear resistance performance and provide good improvement of the steering stability performance on dry road surfaces and improvement of the steering stability performance on wet road surfaces in a compatible manner.

BRIEF DESCRIPTION OF DRAWINGS

FIGS. 6A and 6B illustrate modified examples of the sipe formed in the tread portion and the chamfered portion thereof of the present technology, and FIGS. 6A and 6B are plan views of the respective modified examples.

FIGS. 7A and 7B illustrate other modified examples of the sipe and the chamfered portion thereof of the pneumatic tire according to the present technology, and FIGS. 7A and 7B are plan views of the respective modified examples.

FIGS. 8A to 8E illustrate more other modified examples of the sipe and the chamfered portion thereof of the pneumatic tire according to the present technology, and FIGS. 8A to 8E are plan views of the respective modified examples.

DETAILED DESCRIPTION

The configuration of the present technology is described in detail below with reference to the accompanying drawings. Note that, in FIG. 1, CL is a tire center line.

Figure 1:
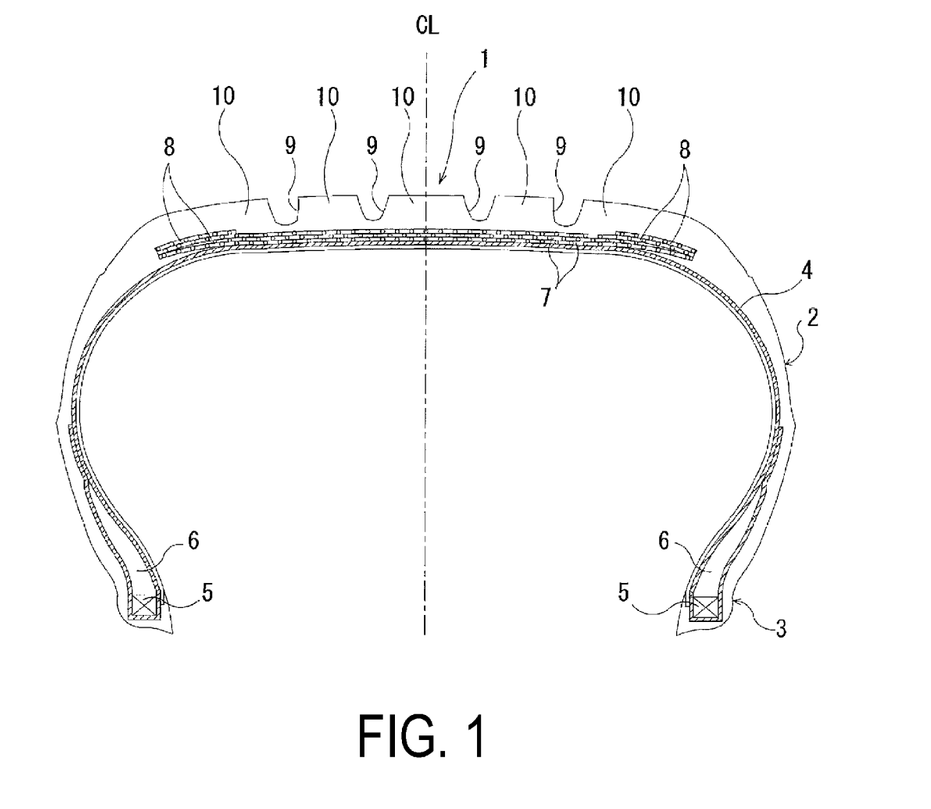
FIG. 1 is a meridian cross-sectional view illustrating a pneumatic tire according to an embodiment of the present technology.

As illustrated in FIG. 1, a pneumatic tire of an embodiment of the present technology includes an annular-shaped tread portion 1 extending in a tire circumferential direction, a pair of sidewall portions 2, 2 disposed on both sides of the tread portion 1, and a pair of bead portions 3, 3 disposed inward of the sidewall portions 2 in a tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of belt layers 7 is embedded on an outer circumferential side of the carcass layer 4 in the tread portion 1. These belt layers 7 include a plurality of reinforcing cords that inclines with respect to the tire circumferential direction and the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define a plurality of ribs 10 in the tread portion 1.

Note that the tire internal structure described above is exemplary in a pneumatic tire, but is not limited thereto.

Figure 2:
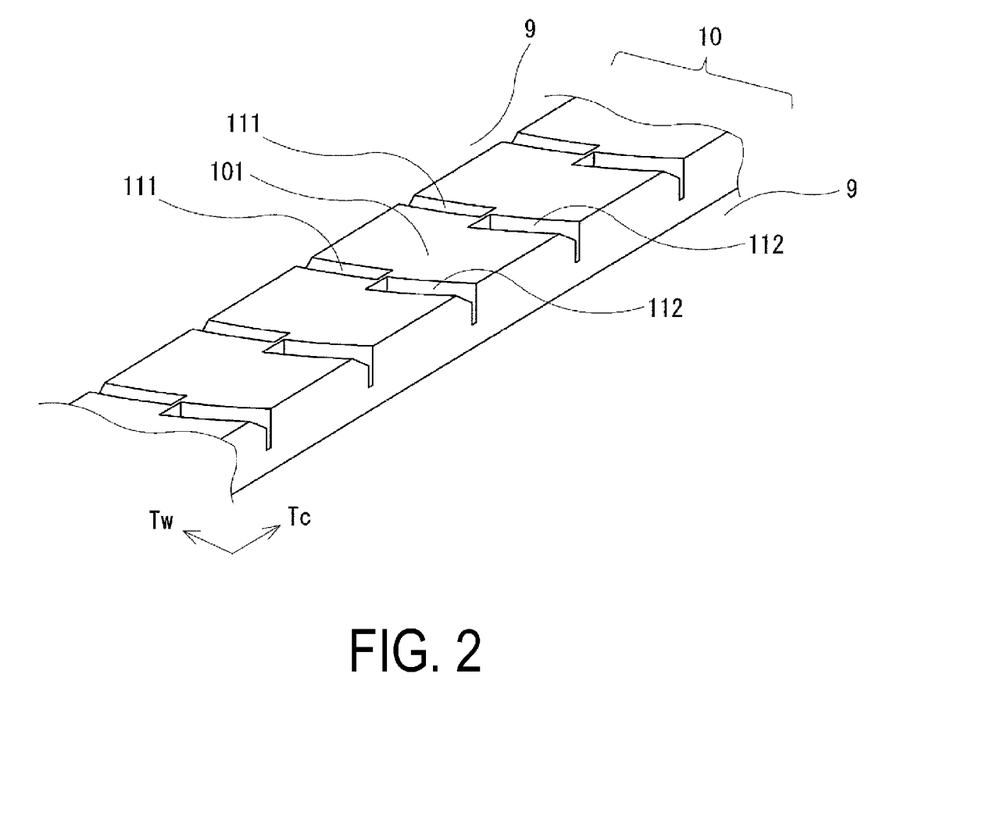
FIG. 2 is a perspective view illustrating part of a tread portion of a pneumatic tire according to the present technology.
Figure 3:
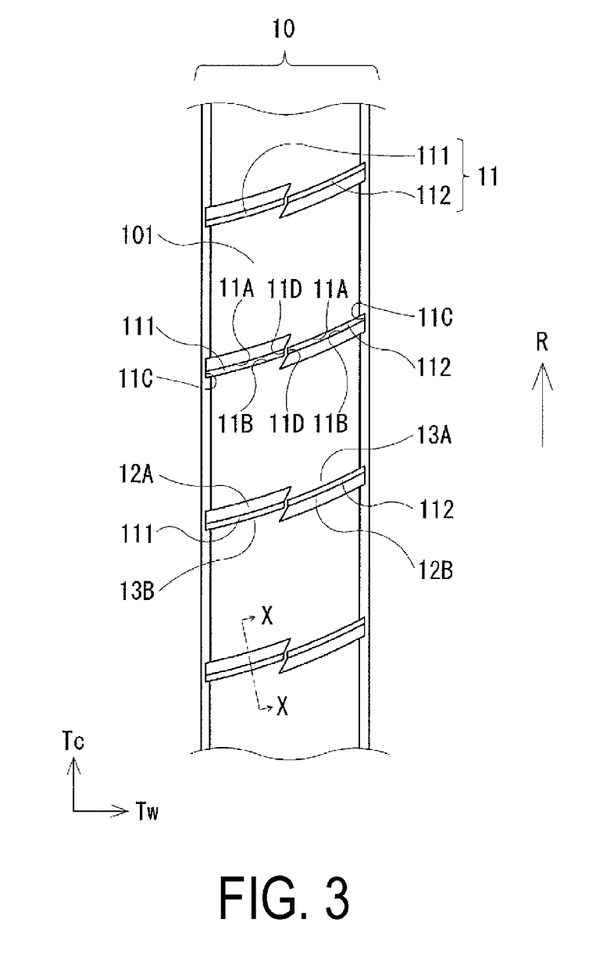
FIG. 3 is a plan view illustrating part of the tread portion of the pneumatic tire according to the present technology.
Figure 4:
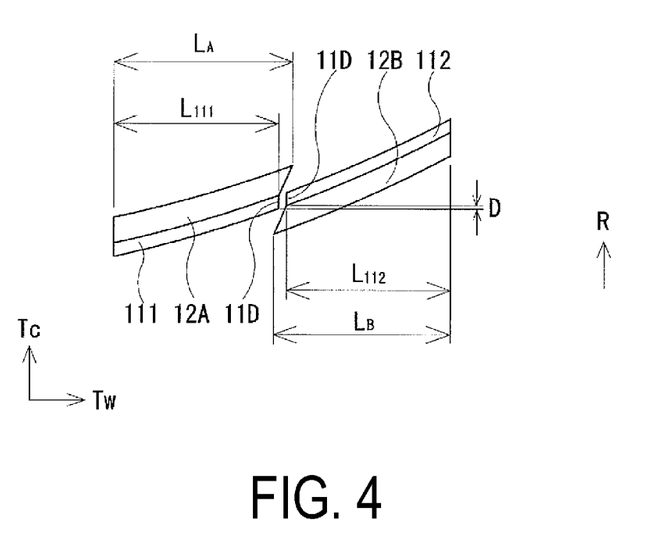
FIG. 4 is a plan view illustrating a sipe formed in the tread portion in FIG. 3 and a chamfered portion thereof.

In FIGS. 2 to 4, Tc is the tire circumferential direction and Tw is a tire lateral direction. As illustrated in FIG. 2, the rib 10 includes a plurality of sipes 111 and 112 extending in the tire lateral direction, and a block 101 defined by the plurality of sipes 111 and 112. The sipe 111 extending from one of the main grooves 9 positioned on both sides of the rib 10 and the 112 extending from another one of the main grooves 9 exist. Since each of the sipes 111 and 112 is an independent sipe, the rib 10 is not divided by the sipe 111 and the sipe 112, and is formed to be continuous at a portion at or near a central portion of the rib 10. A plurality of blocks 101 is disposed side by side in the tire circumferential direction. Each of the sipes 111 and 112 is a narrow groove having a groove width of not greater than 1.5 mm.

As illustrated in FIGS. 3 and 4, the whole shape of each of the sipes 111 and 112 is a curve. The sipes 111 and 112 each include end portions 11C and 11D, and are semi-closed sipes in which only the end portion 11C as one end portion communicates with the main groove 9. That is, the end portion 11C as the one end portion of each of the sipes 111 and 112 communicates with the main groove 9 positioned on one side of the rib 10 and the end portion 11D as the other end portion terminates within the rib 10.

The sipes 111 and 112 oppose with each other within the same rib 10. In these opposing sipes 111 and 112, a distance between the respective end portions 11D in the tire circumferential direction is a distance D. That is, the distance D is a distance between the same portions (bottom ends of the end portions 11D in FIG. 4) in the respective end portions 11D of the sipes 111 and 112 in the tire circumferential direction. At this time, two sipes, that is, the sipe 111 and the sipe 112, for which the distance D is not greater than 15 mm, configure a pair of sipes 11. Note that, in the present technology, even when the sipes 111 and 112 oppose with each other, the sipes do not correspond to the pair of sipes 11 in a case that the distance D exceeds 15 mm. A peripheral length C (mm) of the tire and the distance D (mm) have a relationship of D<C/140.

In the sipes 111 and 112, respective lengths, from one end portion to the other end portion, in the tire lateral direction are sipe lengths $L_{111}$ and $L_{112}$. In the chamfered portions 12A and 12B, respective lengths, from one end portion to the other end portion, in the tire lateral direction are chamfer lengths $L_A$ and $L_B$. Additionally, a total of the sipe length $L_{111}$ of the sipe 111 and the sipe length $L_{112}$ of the sipe 112 is a total sipe length L of the pair of sipes 11. At this time, chamfer lengths $L_A$ and $L_B$ of the respective chamfered portions 12A and 12B are formed so as to be shorter than the total sipe length L.

The pair of sipes 11 include an edge 11A as the leading side with respect to a rotation direction R, and an edge 11B as the trailing side with respect to the rotation direction R. In the pair of sipes 11, respective chamfered portions 12 are formed on the edge 11A on the leading side and the edge 11B on the trailing side.

The chamfered portions 12 include a chamfered portion 12A as the leading side with respect to the rotation direction R, and a chamfered portion 12B as the trailing side with respect to the rotation direction R. Non-chamfered regions 13 on which no other chamfered portion exists exist on portions opposing to these chamfered portions 12. That is, there is a non-chamfered region 13B as the trailing side with respect to the rotation direction R on a portion opposing to the chamfered portion 12A and there is a non-chamfered region 13A as the leading side with respect to the rotation direction R on a portion opposing to the chamfered portion 12B. The chamfered portion 12 and the non-chamfered region 13 on which no other chamfered portion exists are disposed to be adjacent on the edge 11A on the leading side and the edge 11B on the trailing side of the pair of sipes 11, respectively, as described above.

Figure 5:
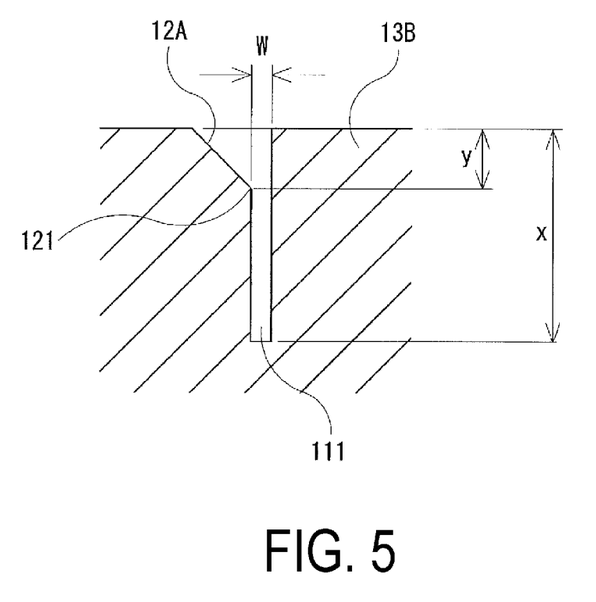
FIG. 5 is a cross-sectional view taken along a line X-X of FIG. 3.

FIG. 5 is a cross-sectional view perpendicular to the sipe 111 and cutting the tread portion 1 off in a vertical direction. As illustrated in FIG. 5, when a maximum depth of the sipe 111 is x (mm) and a maximum depth of the chamfered portion 12 is y (mm), the sipe 111 and the chamfered portion 12 are formed such that the maximum depth x (mm) and the maximum depth y (mm) satisfy Relationship (1) below. The maximum depth x of the sipe 111 is preferably from 3 mm to 8 mm. In a range from an end portion 121 positioned inside the chamfered portion 12 in the tire radial direction to a groove bottom of the sipe 111, a sipe width W of the sipe 111 is substantially constant. This sipe width W, for example, in a case that a protrusion exists on a groove wall of the sipe 111, does not include a height of the protrusion, or in a case that the sipe width of the sipe 111 gradually narrows while proceeding toward the groove bottom, does not include a narrow portion, and thus is a substantially measured width of the sipe 111. Note that, although the sipe 111 is described in the above-described embodiment in FIG. 5, a relationship between the sipe 111 and the chamfered portion 12 is similar for the sipe 112.

$$x \times 0.1 \leq y \leq x \times 0.3 + 1.0 \qquad (1)$$

In the above-described pneumatic tire, by providing the respective chamfered portions 12 shorter than the total sipe length L of the pair of sipes 11 on the edge 11A on the leading side and the edge 11B on the trailing side of the pair of sipes 11, and providing the respective non-chamfered regions 13 on which no other chamfered portion exists on the portions opposing to chamfered portions 12 in the pair of sipes 11, it is possible to enhance the drainage effect based on the chamfered portion 12, and at the same time, to effectively remove a water film on the non-chamfered region 13 on which the chamfered portion 12 is not provided by the edge effect. Accordingly, it is possible to improve steering stability performance on wet road surfaces significantly. Additionally, since the chamfered portion 12 and the non-chamfered region 13 on which no chamfered portion exists are provided on the edge 11A on the leading side and the edge 11B on the trailing side, respectively, in a mixed manner, it is possible to maximally enjoy an effect of enhancing the above-described wet performance during braking and driving. Further, by providing the pair of sipes 11 configured with the two sipes 111 and 112 terminating within the rib 10 and extending from the different main grooves 9, the rib 10 is formed to be continuous at a portion at or near the central portion of the rib 10 without being divided by the pair of sipes 11, thus it is possible to improve the tread rigidity in the tire circumferential direction and improve the braking performance on dry road surfaces.

Additionally, in the above-described pneumatic tire, the maximum depth x (mm) and the maximum depth y (mm) need to satisfy the above-described Relationship (1). By providing the sipes 111 and 112 and the chamfered portions 12 so as to satisfy the above-described Relationship (1), an area to be chamfered may be minimized in comparison with a sipe chamfered as in the related art, thus it is possible to improve the steering stability performance on dry road surfaces. As a result, it is possible to provide good improvement of the steering stability performance on wet road surfaces and improvement of the steering stability performance on dry road surfaces in a compatible manner. Here, in a case of y<x×0.1, the drainage effect based on the chamfered portion 12 becomes insufficient, and conversely in a case of y>x×0.3+1.0, the steering stability performance on dry road surfaces lowers due to decrease in rigidity of the rib 10. Especially, a relationship of y≤x×0.3+0.5 is preferably satisfied.

Figure 6A:
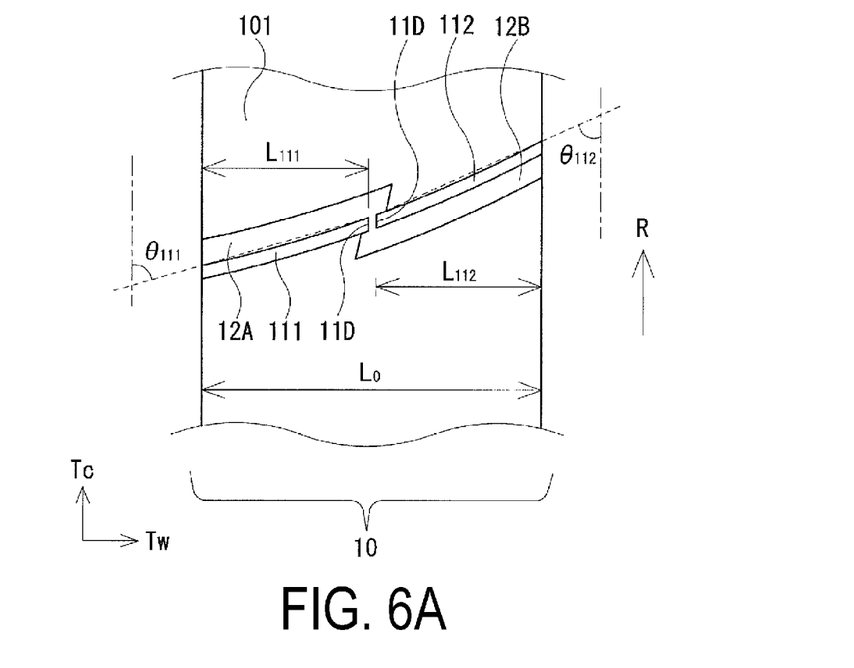
Figure 6B:
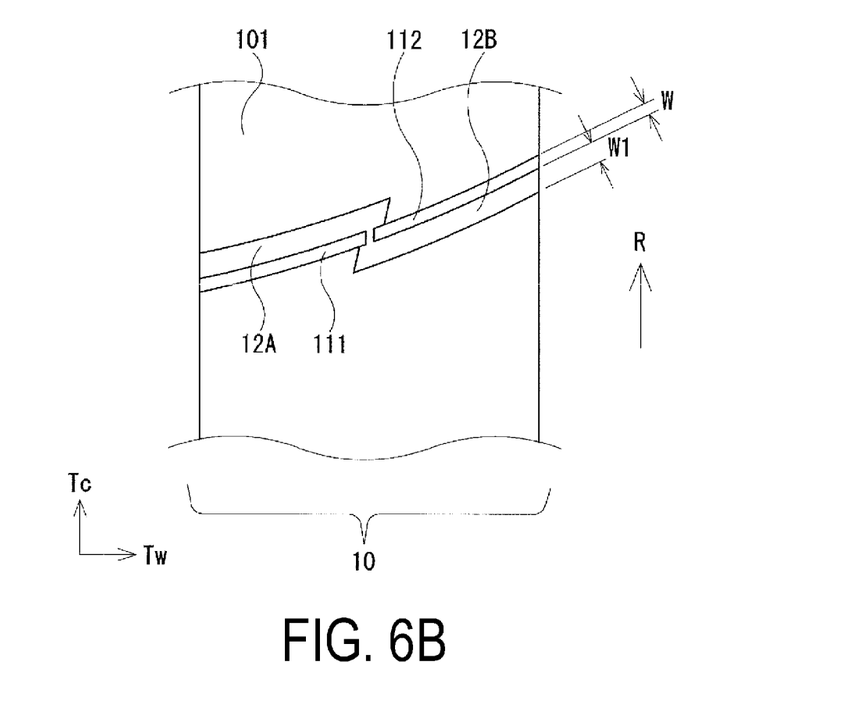

FIGS. 6A and 6B illustrate modified examples of the sipes 111 and 112 formed in the tread portion 1 and the chamfered portions 12A and 12B thereof. As illustrated in FIG. 6A, the chamfered portions 12A and 12B are formed so as to protrude from the end portions 11D of the respective sipes 111 and 112, and extending in a length direction of the sipes 111 and 112. That is, the chamfered portions 12A and 12B extend as decorative grooves in a region in which the sipes 111 and 112 do not exist. Disposing the chamfered portions 12A and 12B as described above makes it possible to provide good improvement of rigidity of the block 101 and enhancement of drainage properties in a compatible manner.

The rib 10 has a constant width in the tire lateral direction, and a width of the rib 10 is a rib width $L_0$. At this time, the total sipe length L of the pair of sipes 11 is preferably from 0.4 to 1.0 times the rib width $L_0$ of the rib 10, and more preferably from 0.5 to 0.7 times $L_0$. As described above, by setting the total sipe length L of the pair of sipes 11 to an appropriate length, it is possible to provide good improvement of the steering stability performance on dry road surfaces and improvement of the steering stability performance on wet road surfaces in a compatible manner, and improve the braking performance on dry road surfaces. Here, when the total sipe length L of the pair of sipes 11 is smaller than 0.4 times the rib width $L_0$ of the rib 10, a sufficient effect of enhancing the steering stability performance on wet road surfaces may not be obtained, and when the L exceeds 1.0 times $L_0$, a sufficient effect of enhancing the braking performance on dry road surfaces may not be obtained.

The sipes 111 and 112 are formed, as illustrated in FIG. 6A, so as to have inclination angles $\theta_{111}$ and $\theta_{112}$ with respect to the tire circumferential direction, respectively. The inclination angles $\theta_{111}$ and $\theta_{112}$ refer to angles formed by an imaginary line connecting both end portions of the sipes 111 and 112 (a dotted line illustrated in FIG. 6A) and lines in parallel with a side surface of the block 101. As the inclination angles $\theta_{111}$ and $\theta_{112}$, inclination angles on the acute angle side and inclination angles on the obtuse angle side exist, and FIG. 6A illustrates the inclination angles $\theta_{111}$ and $\theta_{112}$ on the acute angle side. Additionally, the inclination angles $\theta_{111}$ and $\theta_{112}$ are inclination angles of the respective sipes 111 and 112 at an intermediate pitch of the rib 10. At this time, the inclination angles $\theta_{111}$ and $\theta_{112}$ on the acute angle side are preferably from 40° to 80°, more preferably from 50° to 70°. As described above, by making the sipes 111 and 112 inclined in the tire circumferential direction, it is possible to improve the rigidity of the rib 10 and further improve the steering stability performance on dry road surfaces. Here, when the inclination angles $\theta_{111}$ and $\theta_{112}$ are smaller than 40°, the uneven wear resistance performance deteriorates, and when the angles are greater than 80°, the rigidity of the rib 10 may not be sufficiently improved.

In the present technology, a side having the inclination angles $\theta_{111}$ and $\theta_{112}$ on the acute angle side of the sipes 111 and 112 is an acute angle side, and a side having the inclination angles $\theta_{111}$ and $\theta_{112}$ on the obtuse angle side of the sipes 111 and 112 is an obtuse angle side. The chamfered portions 12A and 12B formed on the edges 11A and 11B of the sipes 111 and 112, respectively, are formed on the acute angle side of the sipes 111 and 112, respectively. In this way, since the acute angle sides of the sipes 111 and 112 are chamfered, it is possible to further enhance the uneven wear resistance performance. Alternatively, the chamfered portions 12A and 12B may be formed on the obtuse angle sides of the sipes 111 and 112, respectively. Since the chamfered portions 12A and 12B are formed on the obtuse angle sides of the sipes 111 and 112, respectively, as described above, the edge effect increases, thereby further improving the steering stability performance on wet road surfaces.

In the present technology, although the curve as the whole shape of each of the above-described sipes 111 and 112 makes it possible to improve the steering stability performance on wet road surfaces, additionally, part of each of the sipes 111 and 112 may have a curving or bending shape in a plan view. By forming the sipes 111 and 112 as described above, total amounts of the edges 11A and 11B of the respective sipes 111 and 112 increase, thereby making it possible to improve the steering stability performance on wet road surfaces.

End portions of the respective chamfered portions 12A and 12B, positioned closer to the main grooves 9, communicate with the main grooves 9 positioned on both side of the rib 10, respectively. Since the chamfered portions 12A and 12B are formed as described above, it is possible to further improve the steering stability performance on wet road surfaces. Alternatively, the end portions of the respective chamfered portions 12A and 12B, positioned closer to the main grooves 9 may terminate within the rib 10 without communicating with the main grooves 9. Since the chamfered portions 12A and 12B are formed as described above, it is possible to further improve the steering stability performance on dry road surfaces.

The chamfered portion 12 is disposed on a position of the edge 11A on the leading side of the sipe 111 and on a position of the edge 11B on the trailing side of the sipe 112. Disposing the chamfered portions 12 as described above makes it possible to improve the uneven wear resistance performance. Here, when the chamfered portion 12 is disposed on more than one positions of the edge 11A on the leading side of the sipe 111 and on more than one positions of the edge 11B on the trailing side of the sipe 112, the number of sections increases, thus the uneven wear resistance performance tends to deteriorate.

As illustrated in FIG. 6B, a maximum value of a width of the chamfered portion 12 measured along a direction orthogonal to the sipes 111 and 112 is a width W1. At this time, the maximum width W1 of the chamfered portion 12 is preferably from 0.8 to 5.0 times the sipe width W of the sipes 111 and 112, more preferably from 1.2 to 3.0 times W. As described above, by appropriately setting the maximum width W1 of the chamfered portion 12 with respect to the sipe width W, it is possible to provide good improvement of the steering stability performance on dry road surfaces and improvement of the steering stability performance on wet road surfaces in a compatible manner. Here, when the maximum width W1 of the chamfered portion 12 is smaller than 0.8 times the sipe width W of the sipes 111 and 112, the steering stability performance on wet road surfaces is insufficiently improved, and when W1 is greater than 5.0 times W, the steering stability performance on dry road surfaces is insufficiently improved.

An outer edge portion in a longitudinal direction of the chamfered portion 12 is formed in parallel with an extension direction of the sipes 111 and 112. Since the chamfered portion 12 extends in parallel with the sipes 111 and 112 as described above, it is possible to improve the uneven wear resistance performance and provide good improvement of the steering stability performance on dry road surfaces and improvement of the steering stability performance on wet road surfaces in a compatible manner.

Figure 7A:
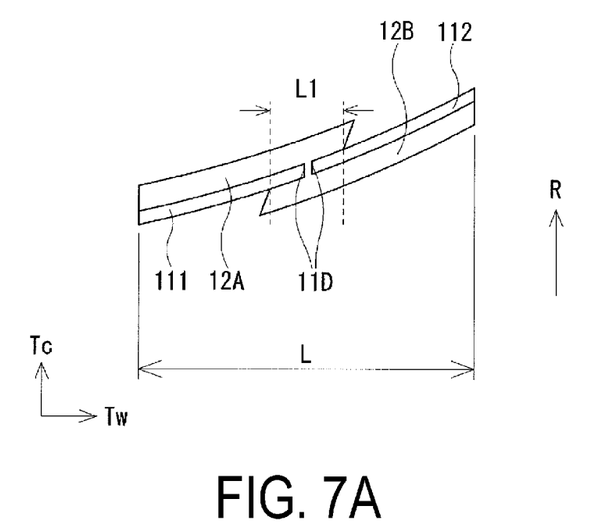
Figure 7B:
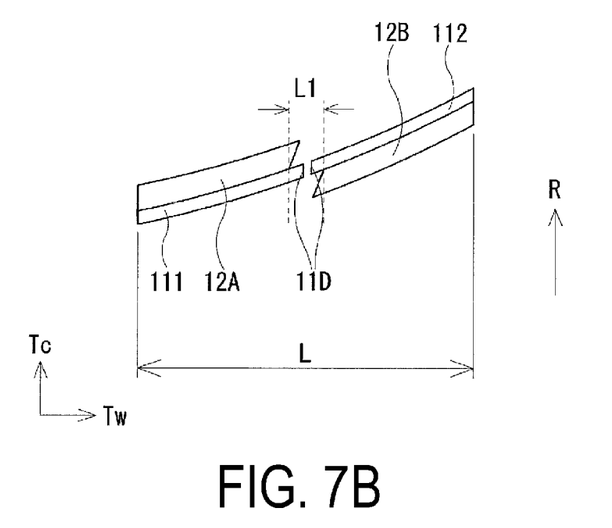

As illustrated in FIG. 7A, the chamfered portion 12A and the chamfered portion 12B are formed such that both parts of the respective chamfered portions 12A and 12B overlap at or near end portions 11D of the respective sipes 111 and 112. Here, a length in the tire lateral direction of an overlapping portion as a portion on which the chamfered portion 12A and the chamfered portion 12B overlap is an overlap length L1. On the other hand, as illustrated in FIG. 7B, when no parts of the chamfered portion 12A and the chamfered portion 12B overlap and the chamfered portions 12A and 12B are distanced at constant intervals, a percentage of the overlap length L1 with respect to the total sipe length L is denoted by a negative value. The overlap length L1 of the overlapping portion is preferably from −30% to 30% of the total sipe length L of the sipe length $L_{111}$ of the sipe 111 and the sipe length $L_{112}$ of the sipe 112, more preferably from −15% to 15% of L. As described above, by appropriately setting the overlap length L1 in the chamfered portions 12A and 12B with respect to the total sipe length L, it is possible to improve the steering stability performance on wet road surfaces. Here, when the overlap length L1 is greater than 30% of L, the steering stability performance on dry road surfaces is insufficiently improved, and when L1 is smaller than −30% of L, the steering stability performance on wet road surfaces is insufficiently improved.

Figure 8A:
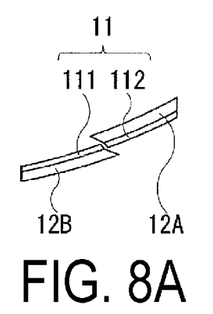
Figure 8B:
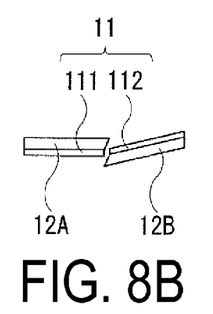
Figure 8C:
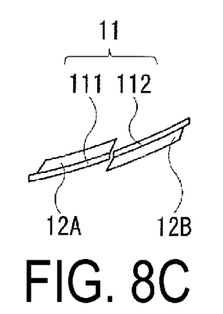
Figure 8D:
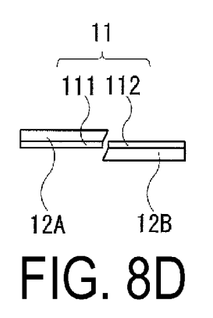
Figure 8E:
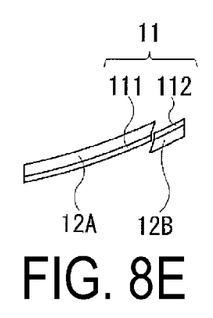

As the chamfered portions 12A and 12B of the pair of sipes 11, besides examples illustrated in FIG. 2 to FIG. 4, FIGS. 6A and 6B, FIGS. 7A and 7B, a case in which the obtuse angle sides of the pair of sipes 11 are chamfered as illustrated in FIG. 8A, a case in which inclination angles of the respective sipes 111 and 112 are greatly different as illustrated in FIG. 8B, and a case in which end portions of the respective chamfered portions 12A and 12B positioned closer to the main grooves 9 terminate within the rib 10 without opening into the main grooves 9 as illustrated in FIG. 8C may be illustrated. Additionally, a case in which the pair of sipes 11 and the chamfered portions 12A and 12B are formed in parallel with the tire lateral direction as illustrated in FIG. 8D, and a case in which a boundary line in the tire lateral direction between the chamfered portion 12A and the chamfered portion 12B is significantly shifted from a center of the pair of sipes 11 as illustrated in FIG. 8E may be illustrated.

Examples

With reference to a pneumatic tire that has a tire size of 245/40R19, that includes a plurality of main grooves extending in a tire circumferential direction in a tread portion, and sipes extending in a tire lateral direction on a rib defined by the main grooves, tires in Conventional Examples 1 and 2, Comparative Examples 1 and 2, and Examples 1 to 12 were manufactured with the following: the disposition of chamfers (both sides or one side), structure of sipe (communicating or not communicating), comparison of total sipe length L and chamfer lengths $L_A$ and $L_B$, presence or absence of chamfer of portion opposing to chamfered portion, maximum depth x of sipe (mm), maximum depth y of chamfered portion (mm), inclination angle on acute angle side with respect to tire circumferential direction of sipe, chamfered position of sipe (acute angle side or obtuse angle side), shape of entire sipe (straight lines or curved), presence or absence of opening into main groove of chamfered portion, percentage of overlap length L1 of chamfered portion with respect to total sipe length L, number of chamfered positions (one or two), maximum width W1 of chamfered portion with respect to sipe width W (W1/W), shape of chamfer (parallel or non-parallel), and total sipe length L with respect to rib width $L_0$ (L/$L_0$), set according to Table 1 and Table 2.

With reference to these test tires, sensory evaluation for the steering stability performance on dry road surfaces and the steering stability performance on wet road surfaces by a test driver, visual evaluation for the uneven wear resistance performance, and evaluation for the braking performance on dry road surfaces were performed, and results were shown altogether in Table 1 and Table 2.

In Table 1 and Table 2, "structure of sipe" is referred to as "communicating" when both of the end portions of the sipes communicate with the respective main grooves positioned on both sides of the rib, and is referred to as "not communicating" when one of the end portions does not communicate with the main groove and terminates within the rib. In the respective tires in Conventional Example 1, Comparative Examples 1 and 2, and Examples 1 to 12, in a range from an end portion positioned inside the chamfered portion in the tire radial direction to the groove bottom of the sipe, the sipe width is constant.

The sensory evaluation for the steering stability performance on dry road surfaces and the steering stability performance on wet road surfaces was performed with each of the test tires assembled on wheels having a rim size of 19×8.5 J, and mounted on a vehicle, and under an air pressure condition of 260 kPa. Evaluation results were expressed as index values, Conventional Example 1 being assigned an index value of 100. Larger index values indicate excellent steering stability performance on dry road surfaces and excellent steering stability performance on wet road surfaces.

The visual evaluation for the uneven wear resistance performance was performed by visually evaluating appearance of the test tires after driving 4000 km with each of the test tires assembled on wheels having a rim size of 19×8.5 J, and mounted on a vehicle, and under an air pressure condition of 260 kPa. Evaluation results were expressed as index values, Conventional Example 1 being assigned an index value of 100. Larger index values indicate excellent uneven wear resistance performance.

The evaluation for the braking performance on dry road surfaces was performed by measuring a braking distance on a dry road surface from an initial velocity of 100 km/h to complete stop, with each of the test tires assembled on wheels having a rim size of 19×8.5 J, and mounted on a vehicle, and under an air pressure condition of 260 kPa. The evaluation results were expressed as index values using the reciprocal of the measurement values, with the Conventional Example 1 being assigned the index value of 100. Larger index values indicate excellent braking performance on dry road surfaces.

TABLE 1

|  | Conventional Example 1 | Conventional Example 2 | Comparative Example 1 | Comparative Example 2 |
|---|---|---|---|---|
| Disposition of chamfers (both sides or one side) | Both sides | One side | Both sides | Both sides |
| Structure of sipe (communicating or not-communicating) | Communicating | Communicating | Not communicating | Not communicating |
| Comparison of total sipe length L and chamfer lengths $L_A$ and $L_B$ | L = $L_A$, $L_B$ | L = $L_A$ | L > $L_A$, $L_B$ | L > $L_A$, $L_B$ |

TABLE 1-continued

|  |  |  |  |  |
|---|---|---|---|---|
| Presence or absence of chamfer of portion opposing to chamfered portion | Presence | Absence | Absence | Absence |
| Maximum depth x of sipe (mm) | 5 mm | 5 mm | 5 mm | 5 mm |
| Maximum depth y of chamfered portion (mm) | 2 mm | 5 mm | 0.3 mm | 3 mm |
| Inclination angle on acute angle side with respect to tire circumferential direction of sipe | 90° | 90° | 90° | 90° |
| Chamfered position of sipe (acute angle side or obtuse angle side) | Obtuse angle side | Obtuse angle side | Obtuse angle side | Obtuse angle side |
| Shape of entire sipe (straight lines or curved) | Straight lines | Straight lines | Straight lines | Straight lines |
| Presence or absence of opening into main groove of chamfered portion | Presence | Presence | Presence | Presence |
| Percentage of overlap length L1 of chamfered portion with respect to total sipe length L | — | — | 0% | 0% |
| Number of chamfered positions (one or two) | 1 | 1 | 1 | 1 |
| Maximum width W1 of chamfered portion with respect to sipe width W (W1/W) | 0.5 | 0.5 | 0.5 | 0.5 |
| Shape of chamfer (parallel or non-parallel) | parallel | parallel | parallel | parallel |
| Total sipe length L with respect to rib width $L_0$ ($L/L_0$) | 1.0 | 1.0 | 0.9 | 0.9 |
| Steering stability performance on dry road surfaces | 100 | 90 | 105 | 99 |
| Steering stability performance on wet road surfaces | 100 | 105 | 98 | 104 |
| Uneven wear resistance performance | 100 | 100 | 100 | 100 |
| Braking performance on dry road surfaces | 100 | 100 | 102 | 102 |

|  | Example 1 | Example 2 | Example 3 | Example 4 |
|---|---|---|---|---|
| Disposition of chamfers (both sides or one side) | Both sides | Both sides | Both sides | Both sides |
| Structure of sipe (communicating or not-communicating) | Not communicating | Not communicating | Not communicating | Not communicating |
| Comparison of total sipe length L and chamfer lengths $L_A$ and $L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |
| Inclination angle on acute angle side with respect to tire circumferential direction of sipe | 90° | 85° | 60° | 60° |
| Chamfered position of sipe (acute angle side or obtuse angle side) | Obtuse angle side | Obtuse angle side | Obtuse angle side | Acute angle side |
| Shape of entire sipe (straight lines or curved) | Straight lines | Straight lines | Straight lines | Straight lines |
| Presence or absence of opening into main groove of chamfered portion | Presence | Presence | Presence | Presence |
| Percentage of overlap length L1 of chamfered portion with respect to total sipe length L | 0% | 0% | 0% | 0% |
| Number of chamfered positions (one or two) | 1 | 1 | 1 | 1 |
| Maximum width W1 of chamfered portion with respect to sipe width W (W1/W) | 0.5 | 0.5 | 0.5 | 0.5 |
| Shape of chamfer (parallel or non-parallel) | parallel | parallel | parallel | parallel |
| Total sipe length L with respect to rib width $L_0$ ($L/L_0$) | 0.9 | 0.9 | 0.9 | 0.9 |
| Steering stability performance on dry road surfaces | 103 | 104 | 105 | 105 |
| Steering stability performance on wet road surfaces | 103 | 103 | 103 | 102 |

TABLE 1-continued

| | | | | |
|---|---|---|---|---|
| Uneven wear resistance performance | 104 | 104 | 104 | 107 |
| Braking performance on dry road surfaces | 102 | 102 | 102 | 102 |

TABLE 2

| | Example 5 | Example 6 | Example 7 | Example 8 |
|---|---|---|---|---|
| Disposition of chamfers (both sides or one side) | Both sides | Both sides | Both sides | Both sides |
| Structure of sipe (communicating or not-communicating) | Not communicating | Not communicating | Not communicating | Not communicating |
| Comparison of total sipe length L and chamfer lengths $L_A$ and $L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |
| Inclination angle on acute angle side with respect to tire circumferential direction of sipe | 60° | 60° | 60° | 60° |
| Chamfered position of sipe (acute angle side or obtuse angle side) | Acute angle side | Acute angle side | Acute angle side | Acute angle side |
| Shape of entire sipe (straight lines or curved) | Curved | Curved | Curved | Curved |
| Presence or absence of opening into main groove of chamfered portion | Presence | Absence | Presence | Presence |
| Percentage of overlap length L1 of chamfered portion with respect to total sipe length L | 0% | 0% | 10% | −10% |
| Number of chamfered positions (one or two) | 1 | 1 | 1 | 1 |
| Maximum width W1 of chamfered portion with respect to sipe width W (W1/W) | 0.5 | 0.5 | 0.5 | 0.5 |
| Shape of chamfer (parallel or non-parallel) | parallel | parallel | parallel | parallel |
| Total sipe length L with respect to rib width $L_0$ ($L/L_0$) | 0.9 | 0.9 | 0.9 | 0.9 |
| Steering stability performance on dry road surfaces | 105 | 106 | 105 | 107 |
| Steering stability performance on wet road surfaces | 105 | 104 | 105 | 103 |
| Uneven wear resistance performance | 107 | 107 | 107 | 107 |
| Braking performance on dry road surfaces | 102 | 102 | 102 | 102 |

| | Example 9 | Example 10 | Example 11 | Example 12 |
|---|---|---|---|---|
| Disposition of chamfers (both sides or one side) | Both sides | Both sides | Both sides | Both sides |
| Structure of sipe (communicating or not-communicating) | Not communicating | Not communicating | Not communicating | Not communicating |
| Comparison of total sipe length L and chamfer lengths $L_A$ and $L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |
| Inclination angle on acute angle side with respect to tire circumferential direction of sipe | 60° | 60° | 60° | 60° |
| Chamfered position of sipe (acute angle side or obtuse angle side) | Acute angle side | Acute angle side | Acute angle side | Acute angle side |
| Shape of entire sipe (straight lines or curved) | Curved | Curved | Curved | Curved |

TABLE 2-continued

| | | | | |
|---|---|---|---|---|
| Presence or absence of opening into main groove of chamfered portion | Presence | Presence | Presence | Presence |
| Percentage of overlap length L1 of chamfered portion with respect to total sipe length L | 0% | 0% | 0% | 0% |
| Number of chamfered positions (one or two) | 2 | 1 | 1 | 1 |
| Maximum width W1 of chamfered portion with respect to sipe width W (W1/W) | 0.5 | 2 | 2 | 2 |
| Shape of chamfer (parallel or non-parallel) | parallel | parallel | non-parallel | parallel |
| Total sipe length L with respect to rib width $L_0$ ($L/L_0$) | 0.9 | 0.9 | 0.9 | 0.5 |
| Steering stability performance on dry road surfaces | 106 | 107 | 105 | 109 |
| Steering stability performance on wet road surfaces | 104 | 109 | 107 | 106 |
| Uneven wear resistance performance | 105 | 112 | 111 | 112 |
| Braking performance on dry road surfaces | 102 | 102 | 102 | 104 |

As understood from Table 1 and Table 2, by devising the shapes of chamfered portions formed on the sipe, the uneven wear resistance performance was enhanced and the steering stability performance on dry road surfaces and the steering stability performance on wet road surfaces were enhanced at the same time for the tires in Examples 1 to 12. Additionally, the braking performance on dry road surfaces of the tires in Examples 1 to 12 was enhanced at the same time.

On the other hand, in Comparative Example 1, since the maximum depth y of the chamfered portion was set to be very shallow, the effect of enhancing the steering stability performance on wet road surfaces was not obtained. Additionally, in Comparative Example 2, since the maximum depth y of the chamfered portion was set to be very deep, an effect of enhancing the steering stability performance on dry road surfaces was not obtained.

The invention claimed is:

1. A pneumatic tire comprising main grooves extending in a tire circumferential direction in a tread portion, the pneumatic tire, comprising:
   sipes extending in a tire lateral direction on a rib defined by the main grooves, wherein
   the sipes include a first sipe extending from one of the main grooves and a second sipe extending from another one of the main grooves, the main grooves being positioned on opposing sides of the rib,
   end portions of the first and second sipes open into the main grooves and other end portions of the first and second sipes terminate within the rib,
   the first and second sipes form a pair sipes, a distance in a tire circumferential direction between the end portions that terminate within the rib is not greater than 15 mm, and the pair of sipes include edges on a leading side and edges on a trailing side,
   chamfered portions shorter than a total sipe length of the pair of sipes are formed on the edges, including on the leading side of the first sipe and on the trailing side of the second sipe, each of the first sipe and the second sipe including only a single one of the chamfered portions,
   non-chamfered regions on which no chamfered portions exist are on the trailing side of the first sipe and the leading side of the second sipe,
   a maximum depth x (mm) of the sipes and a maximum depth y (mm) of the chamfered portions satisfy x×0.1≤y≤x×0.3+1.0,
   a circumferential gap is disposed between a circumferential position where a first sipe of a first pair of sipes opens to the one of the main grooves and a circumferential position where a second sipe of a second pair of sipes opens to the another pair of the main grooves, the second pair of sipes being adjacent to the first pair of sipes without an intervening pair of sipes therebetween,
   a sipe width of the sipes is constant in a range from a portion positioned inside in a tire radial direction of the chamfered portions to a bottom of the sipes, and
   each of the chamfered portions project further inward into the rib, away from the main grooves from which the sipes extend, than the end portions of the sipes that terminate within the rib, and the chamfered portions extend in a length direction of the pair of sipes.

2. The pneumatic tire according to claim 1, wherein a total sipe length of the pair of sipes is from 0.4 to 1.0 times a rib width of the rib.

3. The pneumatic tire according to claim 1, wherein the pair of sipes are inclined with respect to the tire circumferential direction.

4. The pneumatic tire according to claim 3, wherein an inclination angle on an acute angle side with respect to a tire circumferential direction of the pair of sipes is from 40° to 80°.

5. The pneumatic tire according to claim 3, wherein the chamfered portions are disposed on an acute angle side of each sipe of the pair of sipes.

6. The pneumatic tire according to claim 3, wherein the chamfered portions are disposed on an obtuse angle side of each sipe of the pair of sipes.

7. The pneumatic tire according to claim 1, wherein at least part of the pair of sipes curves or bends in a plan view.

8. The pneumatic tire according to claim 1, wherein the chamfered portions open into the main grooves, respectively.

9. The pneumatic tire according to claim 1, wherein the chamfered portions terminate within the rib.

10. The pneumatic tire according to claim 1, wherein an overlap length of a first chamfered portion formed on the leading side of the first sipe and a second chamfered portion formed on the trailing side of the second sipe is 30% or less of the total sipe length.

11. The pneumatic tire according to claim 1, wherein a maximum width of the chamfered portions is from 0.8 to 5.0 times a sipe width of the sipes.

12. The pneumatic tire according to claim 1, wherein the chamfered portions extend in parallel with the sipes.

* * * * *